United States Patent
Song et al.

(10) Patent No.: US 9,917,919 B2
(45) Date of Patent: Mar. 13, 2018

(54) ELECTRONIC APPARATUS AND USER PROFILE ESTIMATING METHOD THEREOF

(71) Applicant: Samsung Electronics Co., Ltd., Suwon-si, Gyeonggi-do (KR)

(72) Inventors: Hee Jun Song, Suwon-si (KR); Joo Seuk Kim, Seoul (KR); Jong Eun Yang, Seoul (KR); Jin Ho Moon, Gwangju (KR); Hee Seon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/974,629

(22) Filed: Dec. 18, 2015

(65) Prior Publication Data

US 2016/0182676 A1    Jun. 23, 2016

(30) Foreign Application Priority Data

Dec. 19, 2014  (KR) .................. 10-2014-0184946

(51) Int. Cl.
*H04L 29/12* (2006.01)
*H04L 29/08* (2006.01)
*G06Q 30/02* (2012.01)
*G06Q 50/26* (2012.01)

(52) U.S. Cl.
CPC ....... *H04L 67/306* (2013.01); *G06Q 30/0201* (2013.01); *G06Q 30/0267* (2013.01); *G06Q 50/265* (2013.01); *H04L 61/1594* (2013.01)

(58) Field of Classification Search
CPC .............. H04L 61/1594; H04L 67/306; G06Q 30/0201; G06Q 30/0267; G06Q 50/265
USPC .......................... 455/414.1, 418–420, 432.3
See application file for complete search history.

(56) References Cited

U.S. PATENT DOCUMENTS

| | | | |
|---|---|---|---|
| 8,676,740 B2 | 3/2014 | Ueki | |
| 9,191,791 B2 | 11/2015 | Jung | |
| 2003/0043974 A1* | 3/2003 | Emerson, III | H04L 29/06 379/88.13 |
| 2006/0085419 A1 | 4/2006 | Rosen | |
| 2006/0161599 A1 | 7/2006 | Rosen | |
| 2008/0288355 A1 | 11/2008 | Rosen | |
| 2010/0131335 A1 | 5/2010 | Roh et al. | |
| 2010/0217743 A1 | 8/2010 | Ueki | |
| 2010/0306185 A1* | 12/2010 | Smith | G06Q 10/107 707/709 |

(Continued)

FOREIGN PATENT DOCUMENTS

| | | |
|---|---|---|
| JP | 2013-196070 A | 9/2013 |
| KR | 10-2013-0060600 A | 6/2013 |

(Continued)

*Primary Examiner* — Michael Mapa
(74) *Attorney, Agent, or Firm* — Jefferson IP Law, LLP

(57) ABSTRACT

An electronic device is provided. The electronic device includes a memory configured to store at least one of a contact list or a call list, a communication module configured to transmit a phone number, included in at least one of the contact list or the call list, to a server and receive company information, associated with the phone number, from the server, and a control module configured to estimate a user profile using at least one of a word included in the contact list or a word included in the company information.

15 Claims, 9 Drawing Sheets

(56) References Cited

U.S. PATENT DOCUMENTS

| | | |
|---|---|---|
| 2011/0125770 A1* | 5/2011 | Battestini ............... G06Q 10/00 |
| | | 707/758 |
| 2011/0276689 A1 | 11/2011 | Rosen |
| 2011/0282750 A1 | 11/2011 | Rosen |
| 2012/0042262 A1 | 2/2012 | Priyadarshan et al. |
| 2013/0218902 A1* | 8/2013 | Vendrow ........... G06F 17/30867 |
| | | 707/748 |
| 2014/0040171 A1 | 2/2014 | Segalov et al. |
| 2014/0179290 A1 | 6/2014 | Jung |
| 2014/0349623 A1* | 11/2014 | Hou ..................... H04M 3/436 |
| | | 455/414.1 |

FOREIGN PATENT DOCUMENTS

| | | |
|---|---|---|
| KR | 10-1341120 B1 | 12/2013 |
| WO | 2006/044939 A2 | 4/2006 |

\* cited by examiner

ELECTRONIC APPARATUS AND USER PROFILE ESTIMATING METHOD THEREOF

CROSS-REFERENCE TO RELATED APPLICATION(S)

This application claims the benefit under 35 U.S.C. § 119(a) of a Korean patent application filed on Dec. 19, 2014 in the Korean Intellectual Property Office and assigned Serial number 10-2014-0184946, the entire disclosure of which is hereby incorporated by reference.

TECHNICAL FIELD

The present disclosure relates to an electronic device which estimates a user profile and a user profile estimating method thereof.

BACKGROUND

A lot of social problems occur with regard to personal information protection. Crimes using illegally collected personal information such as financial fraud and the like are increasing, and thus technical and social efforts for the protection of personal information are being intensified.

In general, various service providers do business activities, such as advertisement, marketing, and the like, based on personal information. However, as the law related to personal information is intensified, it is difficult to collect desired information.

A variety of personal information of a user is stored in an electronic device. Since service providers are punished by law in the situation where personal information stored on an electronic device is made public without user consent, the service providers may have difficulty in directly collecting a variety of personal information stored on the electronic device. Therefore, there is a need for a method for estimating various user profiles using personal information legally collected.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which estimates various user profiles using a contact list or a call list stored therein and a user profile estimating method thereof.

In accordance with an aspect of the present disclosure, an electronic device is provided. The electronic device includes a memory configured to store at least one of a contact list or a call list, a communication module configured to transmit a phone number, included in at least one of the contact list or the call list, to a server and to receive company information associated with the phone number from the server, and a control module configured to estimate a user profile using at least one of a word included in the contact list or a word included in the company information.

In accordance with another aspect of the present disclosure, a user profile estimating method of an electronic device is provided. The user profile estimating method includes storing at least one of a contact list or a call list in a memory, transmitting a phone number, included in at least one of the contact list or the call list, to a server, receiving company information associated with the phone number from the server, and estimating a user profile using at least one of a word included in the contact list or a word included in the company information.

In accordance with another aspect of the present disclosure, a non-transitory computer-readable recording medium recorded with a program performing a method is provided. The method includes storing at least one of a contact list or a call list in a memory, transmitting a phone number, included in at least one of the contact list or the call list, to a server, receiving company information associated with the phone number from the server, and estimating a user profile using at least one of a word included in the contact list or a word included in the company information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
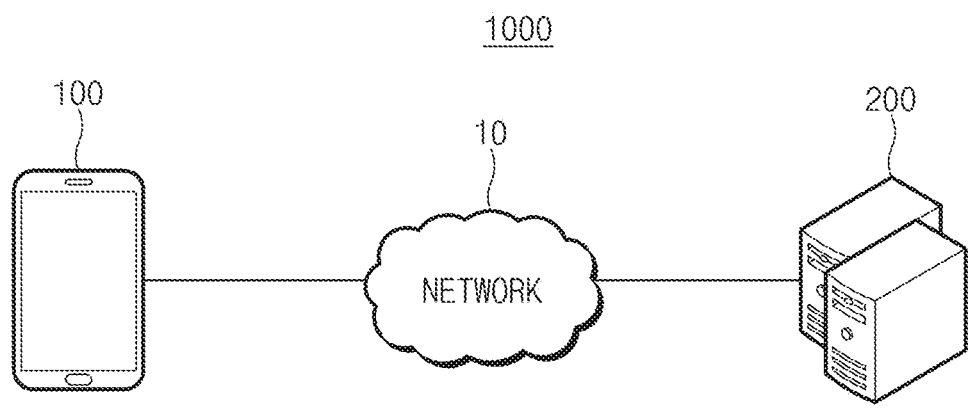
FIG. 1 is a diagram schematically illustrating a user profile estimating system according to various embodiments of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™ Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to an embodiment of the present disclosure, an electronic device may be a flexible electronic. Also, electronic devices according to various embodiments of the present disclosure are not limited to the above-mentioned devices, and may include new electronic devices according to technology development.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

FIG. 1 is a diagram schematically illustrating a user profile estimating system according to various embodiments of the present disclosure.

Referring to FIG. 1, a user profile estimating system 1000 may include an electronic device 100 and a server 200 communicating via a network 10. According to various embodiments of the present disclosure, the user profile estimating system 1000 may estimate a user profile using at least one of a contact list or a call list stored in the electronic device 100. The user profile may include, for example, at least one of sex, age group, occupation, whether he or she is married, whether he or she plans to marry, whether he or she has children, whether he or she has a pet, whether he or she has a car, whether he or she has moved to a new place, or a residential district.

According to various embodiments of the present disclosure, the electronic device 100 or the server 200 may extract a specific word for estimating the user profile using the contact list or the call list and may estimate a profile of a user through the extracted word.

The electronic device 100 and the server 200 may be connected to a network to communicate with each other. For example, the electronic device 100 and the server 200 may be connected to an internet network or a mobile communication network.

According to an embodiment of the present disclosure, the electronic device 100 may store a contact list or a call list. The contact list may include, for example, at least one of a phone number, a word (e.g., a name or a company name), or group information. The call list may include at least one of a phone number of the other party or call time information in the case where a user makes a call using the electronic device 100.

According to an embodiment of the present disclosure, the electronic device 100 may store a user profile. The electronic device 100 may store and update the estimated user profile which is received from the server 200 or is estimated based on a contact list or a call list.

The server 200 may store company information database. The company information may include a district, a company name, or a business category associated with a phone number. According to an embodiment of the present disclosure, the server 200 may map and store a phone number onto company information. The server 200 may search for at least one of a district, a company name, or a business category associated with a phone number received from the electronic device 100, using the company information database.

The server 200 may store user profile database. The server 200 may store and update a user profile which is received from the electronic device 100 or is estimated based on a contact list or a call list.

The server 200 may store a user profile estimating algorithm. The user profile estimating algorithm may include information used to estimate a specific user profile, a method for collecting desired information, or information about whether to estimate a user profile in any manner using the collected information. According to an embodiment of the present disclosure, the user profile estimating algorithm may be learning algorithm. The user profile estimating algorithm may learn a user profile estimating method based on reliable information such as a profile that a user directly inputs, thereby improving accuracy.

The server 200 may store a word list associated with the user profile. For example, the server 200 may map and store a specific user profile onto a word list associated therewith.

The server 200 may store user profile probability information. For example, the server 200 may store probability information that a user storing a specific word (or making conversation using a phone number associated with a specific word), probability information that a user corresponding to a specific user profile stores a specific word (or make a call using a phone number associated with a specific word), ratio (or probability) information of users, corresponding to a specific user profile, to all users, or ratio (or probability) information of users, storing a specific user profile, to all users. The user profile probability information may be changed according to join, deletion, a contact list, a call history, and the like of a user utilizing the user profile estimating system and may be continuously updated.

According to various embodiments of the present disclosure, the server 200 may be operated with a plurality of servers which are physically separated. For example, a server which stores database including company information associated with a phone number, a server which stores and updates a user profile, and a server which stores and updates algorithm for estimating a user profile may be operated independently of each other.

According to various embodiments of the present disclosure, a user profile may be estimated by one of the electronic device 100 and the server 200. For example, the electronic device 100 may receive a variety of information (e.g., the user profile estimating algorithm, a word list associated with a user profile, the user profile probability information, and the like), needed to estimate a user profile, from the server 200 and may estimate a user profile using a contact list or a call list. Alternatively, the server 200 may receive a contact list or a call list from the electronic device 100 and estimate a user profile using the received a contact list or call list.

Figure 2:
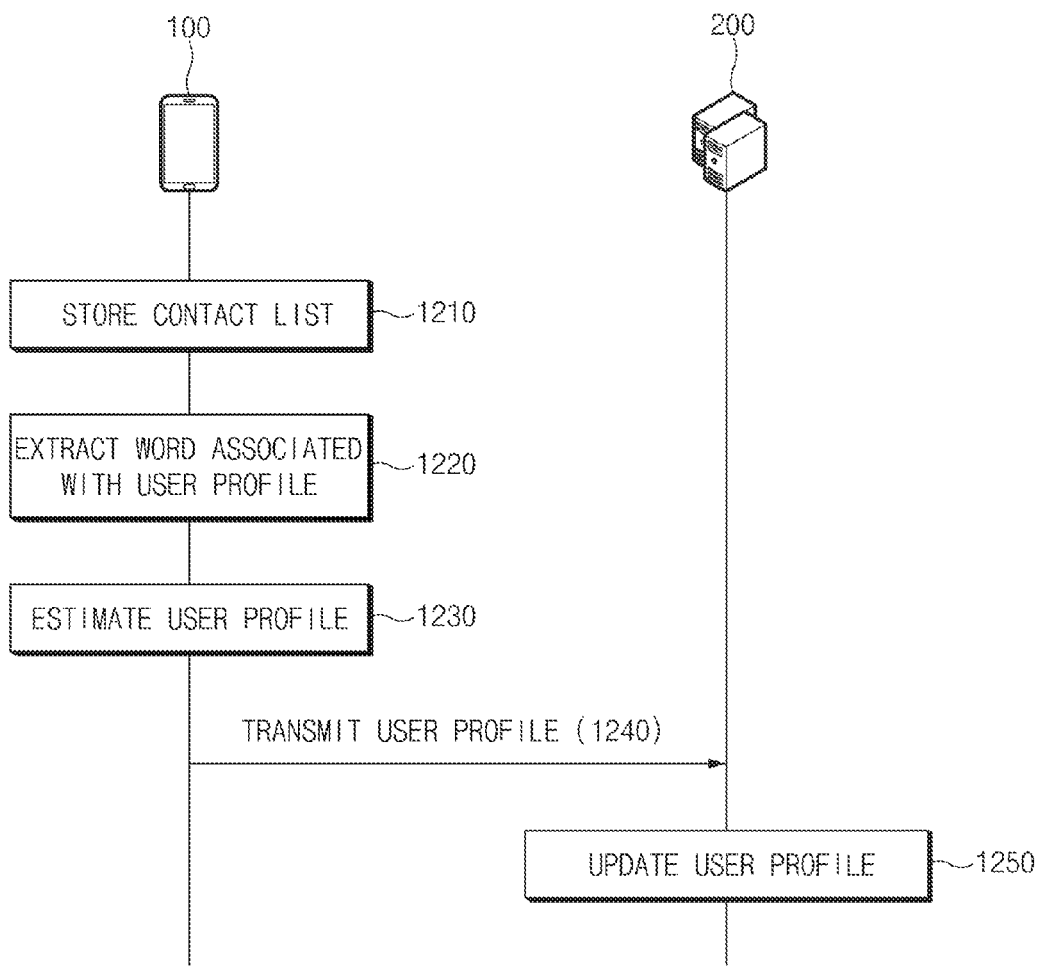
FIG. 2 is a diagram schematically illustrating a user profile estimating method of a user profile estimating system according to various embodiments of the present disclosure.

FIG. 2 is a diagram schematically illustrating a user profile estimating method of a user profile estimating system according to various embodiments of the present disclosure. In FIG. 2, an embodiment of the present disclosure is exemplified as the electronic device 100 estimates a use profile using a contact list.

Referring to FIG. 2, in operation 1210, the electronic device 100 may store a contact list.

The electronic device 100, in operation 1220, may extract a user profile relating word among words included in the contact list. According to an embodiment of the present disclosure, the electronic device 100 may extract the user profile relating word among words included in a specific group of the contact list. For example, the electronic device 100 may extract a word stored in a group "family" in the case of estimating whether a user is married. According to an embodiment of the present disclosure, the electronic device 100 may extract the user profile relating word using a word list associated with a user profile. The word list associated with the user profile may be received from the server 200 and may be previously stored in the electronic device 100. For example, in the case of estimating whether the user is married, the electronic device 100 may extract words such as father-in-law of one's wife, mother-in-law of one's wife, father, mother, father-in-law of one's husband, mother-in-law of one's husband, sister-in-law of one's wife, elder sister of one's wife, younger brother of one's husband, younger master, sister of one's husband, and the like.

The electronic device 100, in operation 1230, may estimate a user profile using the extracted word(s). According to an embodiment of the present disclosure, the electronic device 100 may estimate the user profile using the user profile estimating algorithm. The user profile estimating algorithm may be received from the server 200 and may be previously stored in the electronic device 100. According to an embodiment of the present disclosure, the electronic device 100 may estimate the user profile based on the number of extracted words. For example, if the number of extracted marriage relating words such as father-in-law of one's wife, mother-in-law of one's wife, sister-in-law of one's wife, and the like is greater than or equal to a specific number in the case of estimating whether the user is married, the electronic device 100 may determine the user as being married. Alternatively, if the number of the marriage-related words thus extracted is smaller than the specific number in the case of estimating whether the user is married, the electronic device 100 may determine the user as being single. According to an embodiment of the present disclosure, the electronic device 100 may estimate the user profile based on probability information of the user profile. For example, in the case of estimating whether the user is married, the electronic device 100 may compute the probability that the user is married or the probability that the user is single, based on the user profile probability information. If the probability that the user is married is higher than the probability that the user is single, the electronic device 100 may estimate the user as being married. If the probability that the user is single is higher than the probability that the user is married, the electronic device 100 may estimate the user as being single.

In operation 1240, the electronic device 100 may transmit the estimated user profile to the server 200.

If the user profile is received from the electronic device 100, in operation 1250, the server 200 may update the user profile of a corresponding user.

Figure 3:
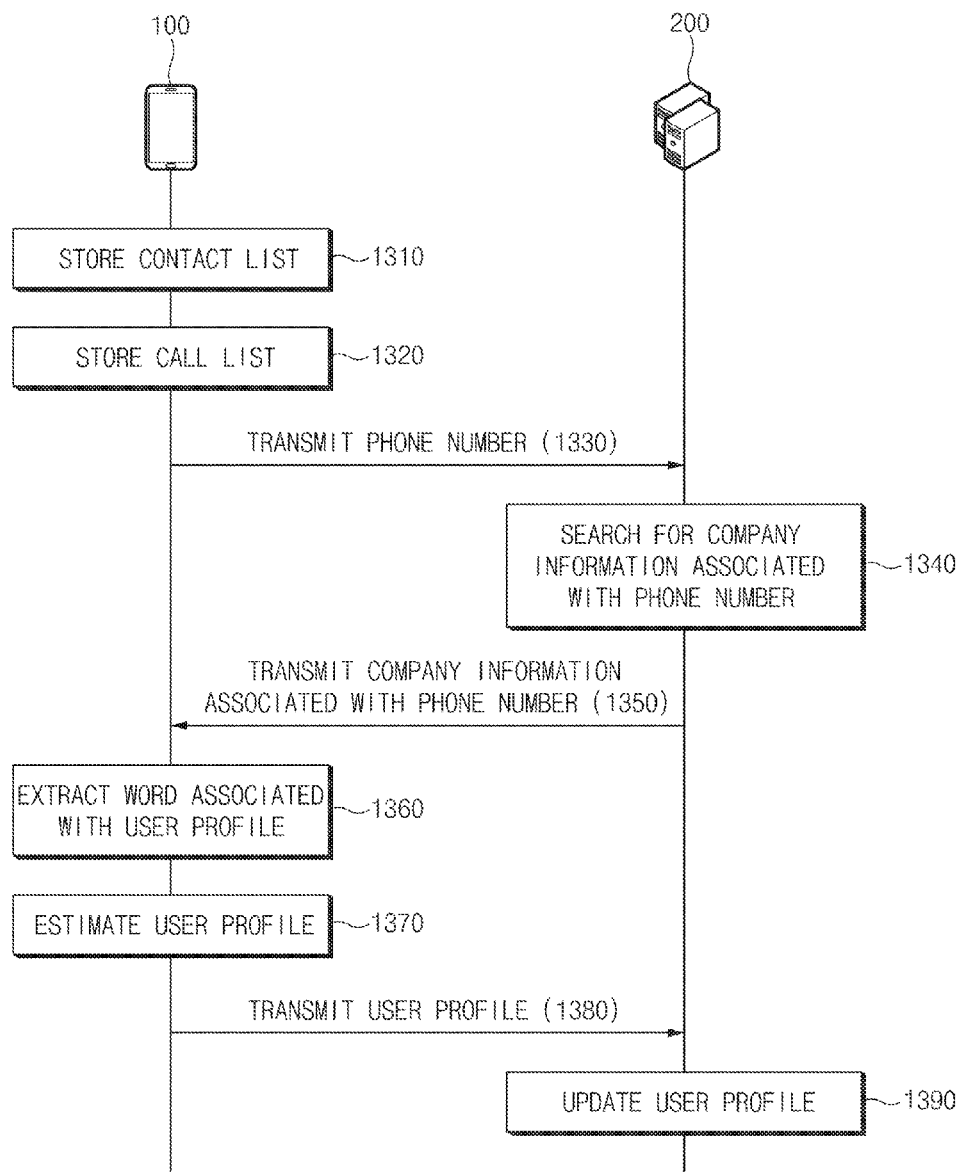
FIG. 3 is a diagram schematically illustrating a user profile estimating method of a user profile estimating system according to various embodiments of the present disclosure.

FIG. 3 is a diagram schematically illustrating a user profile estimating method of a user profile estimating system according to various embodiments of the present disclosure. In FIG. 3, an embodiment of the present disclosure is exemplified as the electronic device 100 estimates a user profile using a contact list and a call list.

Referring to FIG. 3, in operation 1310, the electronic device 100 may store a contact list. In operation 1320, the electronic device 100 may store a call list.

In operation 1330, the electronic device 100 may transmit a phone number(s) included in the contact list or the call list to the server 200. According to an embodiment of the present disclosure, the electronic device 100 may transmit a phone number, not stored in the contact list, from among phone numbers included in the call list to the server 200. According to an embodiment of the present disclosure, the electronic device 100 may transmit a phone number, being within a specific time, from among phone numbers included in the call list or the specific number of recent phone numbers from among phone numbers included in the call list to the server 200. According to an embodiment of the present disclosure, the electronic device 100 may transmit a phone number, being within a specific time, from among phone numbers not stored in the contact list or the specific number of recent phone numbers from among phone numbers not stored in the contact list to the server 200.

The server 200, in operation 1340, may search for company information associated with a phone number received from the electronic device 100. For example, the server 200 may search for a district, a company name, or a business category associated with a phone number from the company information database. In operation 1350, the server 200 may transmit the found company information to the electronic device 100.

In operation 1360, the electronic device 100 may extract a word(s), associated with the user profile, from among words included in the contact list or words included in the company information. According to an embodiment of the present disclosure, thee electronic device 100 may extract a word(s), associated with the user profile, from among words included in a specific group of the contact list. For example, the electronic device 100 may extract a word(s) stored in the group "family" or "friends" in the case of estimating the age of the user. According to an embodiment of the present disclosure, the electronic device 100 may extract a word(s) associated with the user profile using a word list associated with the user profile. The word list associated with the user profile may be received from the server 200 and may be previously stored in the electronic device 100. For example, in the case of estimating whether the user has a car, the electronic device 100 may extract words such as car, garage, car insurance, fire, gas station, car center, car repair, liquefied petroleum gas (LPG) filling station, car place, car maintenance, car tuning, and the like.

The electronic device 100, in operation 1370, may estimate the user profile using the extracted word(s). According to an embodiment of the present disclosure, the electronic device 100 may estimate the user profile using the user profile estimating algorithm. The user profile estimating algorithm may be received from the server 200 and may be previously stored in the electronic device 100. According to an embodiment of the present disclosure, the electronic device 100 may estimate the user profile based on the number of extracted words. For example, if the number of extracted car-related words, such as garage, car insurance, gas station, and the like, is greater than or equal to a specific number in the case of estimating whether the user has a car, the electronic device 100 may estimate the user has a car. Alternatively, if the number of car-related words thus extracted is smaller than the specific number, the electronic device 100 may estimate the user does not have a car. According to an embodiment of the present disclosure, the electronic device 100 may estimate the user profile based on probability information of the user profile. For example, in the case of estimating whether the user has a car, the electronic device 100 may compute the probability that the user has a car or the probability that the user does not have a car, based on user profile probability information. If the probability that the user has a car is higher than the probability that the user does not have a car, the electronic device 100 may estimate that the user has a car. If the probability that the user does not have a car is higher than the probability that the user has a car, the electronic device 100 may estimate that the user does not have a car. The probability information of the user profile may be received from the server 200 and may be previously stored in the electronic device 100.

In operation 1380, the electronic device 100 may transmit the estimated user profile to the server 200.

If the user profile is received from the electronic device 100, in operation 1390, the server 200 may update the user profile of the user.

Figure 4:
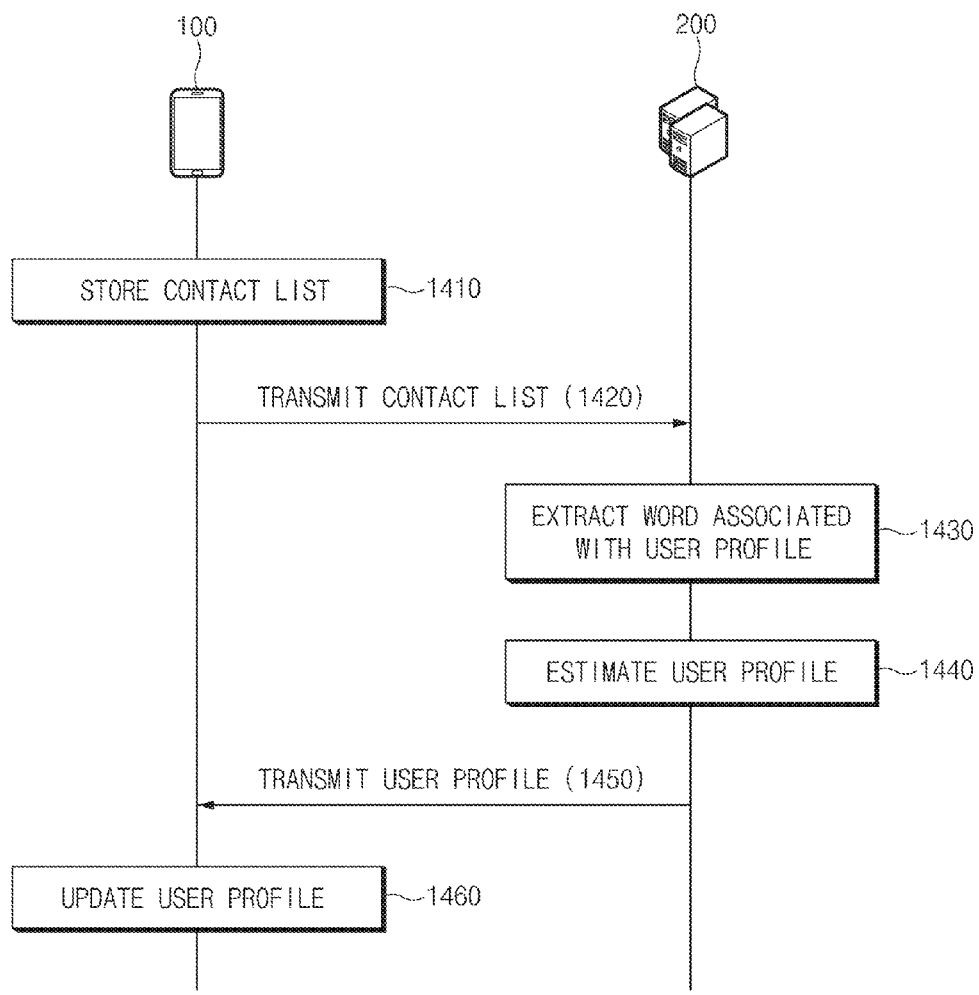
FIG. 4 is a diagram schematically illustrating a user profile estimating method of a user profile estimating system according to various embodiments of the present disclosure.

FIG. 4 is a diagram schematically illustrating a user profile estimating method of a user profile estimating system according to various embodiments of the present disclosure. In FIG. 4, an embodiment of the present disclosure is exemplified as the server 200 estimates a user profile using a contact list received from the electronic device 100.

Referring to FIG. 4, in operation 1410, the electronic device 100 may store a contact list. In operation 1420, the electronic device 100 may transmit the contact list to the server 200.

The server 200, in operation 1430, may extract a word(s), associated with a user profile, from among words included in the contact list. According to an embodiment of the present disclosure, the server 200 may extract a word(s), associated with the user profile, from among words included in a specific group of the contact list. For example, the server 200 may extract a word(s) stored in the group "family" or "friends" in the case of estimating the age group of the user. According to an embodiment of the present disclosure, the server 200 may extract a user profile-related word(s) using a word list associated with the user profile. For example, in the case of estimating whether the user plans to many, the server 200 may extract words such as wedding hall, studio, dress, travel company, wedding invitation, wedding, honeymoon, wedding photo, and the like.

The server 200, in operation 1440, may estimate the user profile using the extracted words. According to an embodiment of the present disclosure, the server 200 may estimate the user profile using the user profile estimating algorithm. According to an embodiment of the present disclosure, the server 200 may estimate the user profile based on the number of extracted words. For example, if the number of extracted marriage-related words, such as wedding, wedding hole, dress, travel company, honeymoon, and the like, is greater than or equal to a specific number, the server 200 may estimate that the user plans to many. If the number of extracted marriage-related words is smaller than the specific number, the server 200 may estimate that the user is single. According to an embodiment of the present disclosure, the server 200 may estimate the user profile based on probability information of the user profile. For example, in the case of estimating whether the user plans to many, the server 200 may compute the probability that the user plans to many or the probability that the user does not plan marriage, based on user profile probability information. If the probability that the user plans to many is higher than the probability that the user does not plan marriage, the server 200 may estimate that the user plans to many. If the probability that the user does not plan marriage is higher than the probability that the user plans to many, the server 200 may estimate that the user does not plan marriage.

In operation 1450, the server 200 may transmit the estimated user profile to the electronic device 100.

If the user profile is received from the server 200, in operation 1460, the electronic device 100 may update the user profile of a corresponding user.

Figure 5:
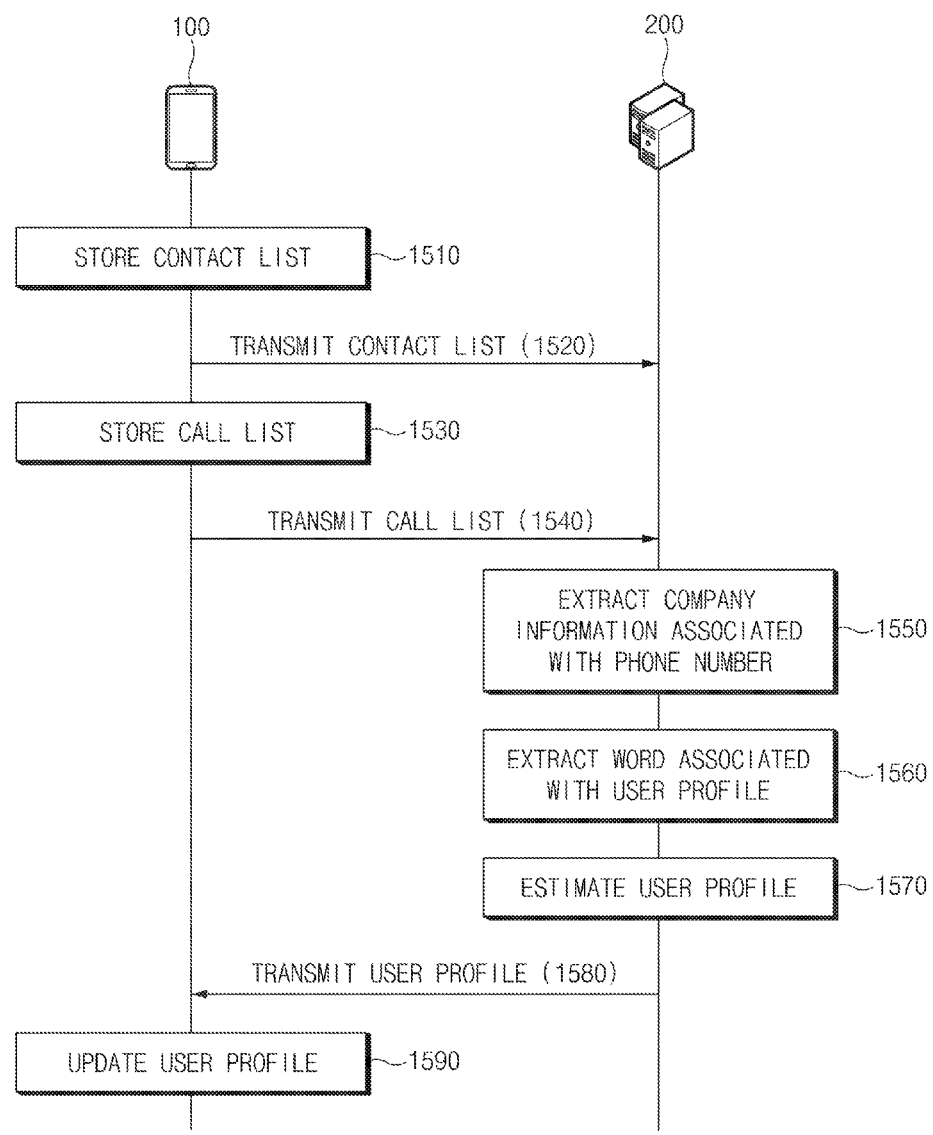
FIG. 5 is a diagram schematically illustrating a user profile estimating method of a user profile estimating system according to various embodiments of the present disclosure.

FIG. 5 is a diagram schematically illustrating a user profile estimating method of a user profile estimating system according to various embodiments of the present disclosure. In FIG. 5, an embodiment of the present disclosure is exemplified as the server 200 estimates a user profile using a contact list and a call list received from the electronic device 100.

Referring to FIG. 5, in operation 1510, the electronic device 100 may store a contact list. In operation 1520, the electronic device 100 may transmit the contact list to the server 200.

In operation 1530, the electronic device 100 may store a call list. In operation 1540, the electronic device 100 may transmit the call list to the server 200.

In operation 1550, the server 200 may search for company information associated with a phone number included in the contact list or the call list. For example, the server 200 may search for at least one of a district, a company name, or a business category associated with a phone number from company information database. According to an embodiment of the present disclosure, the server 200 may search for company information associated with a phone number, not included in the contact list, from among phone numbers included in the call list. According to an embodiment of the present disclosure, the server 200 may search for company information associated with a phone number, being within a specific time, from among phone numbers included in the call list or the specific number of recent phone numbers thereof. According to an embodiment of the present disclosure, the server 200 may search for company information associated with a phone number, being within a specific time, from among phone numbers not included in the contact list or the specific number of recent phone numbers thereof.

The server 200, in operation 1560, may extract a word(s), associated with the user profile, from among words included in the contact list or words included in company information. According to an embodiment of the present disclosure, the server 200 may extract a word(s), associated with the user profile, from among words included in a specific group of the contact list. According to an embodiment of the present disclosure, the server 200 may extract a user profile-related word(s) using a word list associated with the user profile. For example, in the case of estimating whether the user has a pet, the server 200 may extract words such as animal hospital, pet shop, dog, puppy, cat, pet, pet supplies, and the like.

In operation 1570, the server 200 may estimate the user profile using the extracted words. According to an embodiment of the present disclosure, the server 200 may estimate the user profile using the user profile estimating algorithm. According to an embodiment of the present disclosure, the server 200 may estimate the user profile based on the number of estimated words. For example, if the number of extracted pet-related words such as animal hospital, pet shop, and the like, is greater than or equal to a specific number, the server 200 may determine the user as having a pet. If the number of extracted pet-related words is smaller than the specific number, the server 200 may estimate that the user does not have a pet. According to an embodiment of the present disclosure, the server 200 may estimate the user profile based on probability information of the user profile. For example, in the case of estimating whether the user has a pet, the server 200 may compute the probability that the user has a pet or the probability that the user does not a pet, based on the user profile probability information. If the probability that the user has a pet is higher than the probability that the user does not a pet, the server 200 may estimate that the user has a pet. If the probability that the user does not have a pet is higher than the probability that the user has a pet, the server 200 may estimate that the user does not have a pet.

In operation 1580, the server 200 may transmit the estimated user profile to the electronic device 100.

If the user profile is received from the server 200, in operation 1590, the electronic device 100 may update the user profile of the user.

Figure 6:
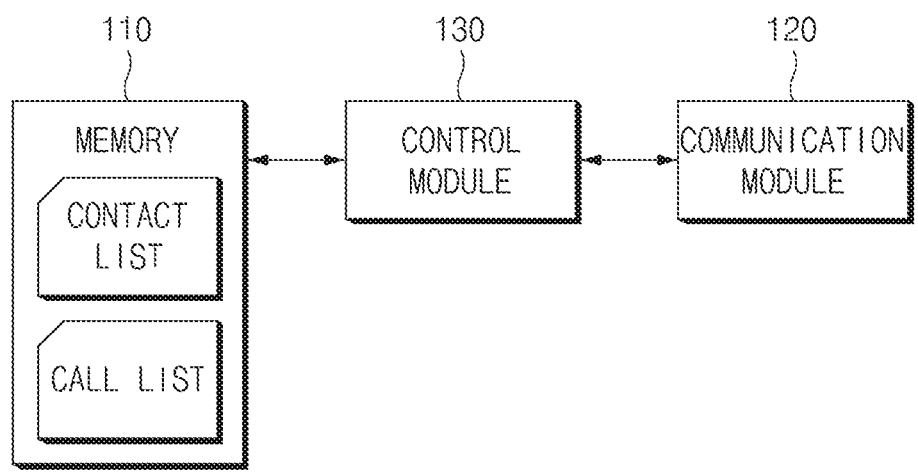
FIG. 6 is a block diagram schematically illustrating an electronic device according to various embodiments of the present disclosure.

FIG. 6 is a block diagram schematically illustrating an electronic device according to various embodiments of the present disclosure.

Referring to FIG. 6, the electronic device 100 may include a memory 110, a communication module 120, and a control module 130.

The memory 110 may store a contact list or a call list. The contact list may include, for example, at least one of a phone number, a word (e.g., a name or a company name), or group information. The call list may include at least one of a phone number of the other party or call time information in the case where a user makes a call using the electronic device 100.

According to an embodiment of the present disclosure, the memory 110 may store a user profile. The memory 110 may store and update a user profile which is received from the server 200 or is extracted based on a contact list or a call list.

The communication module 120 may be connected with the server 200 through a network and may communicate with the server 200.

According to an embodiment of the present disclosure, the communication module 120 may transmit a user profile, which the electronic device 100 estimates, to the server 200 or may receive a user profile which the server 200 estimates.

According to an embodiment of the present disclosure, the communication module 120 may transmit a phone number included in a contact list or a call list to the server 200 and may receive company information associated with the phone number from the server 200.

According to an embodiment of the present disclosure, the communication module 120 may transmit a contact list or a call list to the server 200.

According to an embodiment of the present disclosure, the communication module 120 may receive user profile estimating algorithm, a word list associated with a user profile, or user profile probability information from the server 200. The user profile estimating algorithm, the word list associated with a user profile, or the user profile probability information received from the server 200 may be stored in the memory 110 and may be used to estimate a user profile according to various embodiments.

The control module 130 may control an overall operation of the electronic device 100. For example, the control module 130 may control the memory 110 and the communication module 120 respectively and may estimate a user profile according to various embodiments.

According to an embodiment of the present disclosure, the control module 130 may perform control to transmit a phone number included in a contact list or a call list to the server 200. According to an embodiment of the present disclosure, the control module 130 may perform control to transmit a phone number, not stored in a contact list, from among phone numbers included in a call list to the server 200. According to an embodiment of the present disclosure, the control module 130 may perform control to transmit a phone number, being within a specific time (e.g., one month), from among phone numbers included in a call list or the specific number (e.g., 100) of recent phone numbers thereof to the server 200. According to an embodiment of the present disclosure, the control module 130 may perform control to transmit a phone number, being within a specific time, from among phone numbers not included in a contact list or the specific number of recent phone numbers thereof to the server 200.

The control module 130 may estimate a user profile using user profile estimating algorithm. The user profile estimating algorithm may include information needed to estimate a specific user profile, a method for collecting desired information, or information about whether to estimate a user profile in any manner using the collected information. The control module 130 may estimate a user profile using at least one of a word included in a contact list or a word included in company information, based on the user profile estimating algorithm. For example, the control module 130 may extract a word(s), associated with a user profile, from among words included in a contact list or words included in company information using a word list associated with the user profile and may estimate the user profile using the extracted word(s). According to an embodiment of the present disclosure, the control module 130 may extract a word(s), associated with the user profile, from among words included in a specific group of the contact list. For example, the control module 130 may extract a word(s) stored in the group "family" in the case of estimating whether a user is married. The control module 130 may extract a word(s) stored in the group "family" or "friends" in the case of estimating the age of the user.

According to an embodiment of the present disclosure, the control module 130 may estimate a user profile based on the number of extracted words. If the number of extracted marriage-related words such as father-in-law of one's wife, mother-in-law of one's wife, sister-in-law of one's wife, and the like is greater than or equal to a specific number, the control module 130 may determine the user as being married. In contrast, if the number of marriage-related words thus extracted is smaller than the specific number, the control module 130 may determine the user as being single. According to an embodiment of the present disclosure, the control module 130 may estimate a user profile based on probability information of the user profile. For example, in the case of estimating whether the user is married, the control module 130 may compute the probability that the user is married or the probability that the user is single, based on user profile probability information. If the probability that the user is married is higher than the probability that the user is single, the control module 130 may estimate that the user is married. If the probability that the user is single is higher than the probability that the user is married, the control module 130 may estimate that the user is single.

Figure 7:
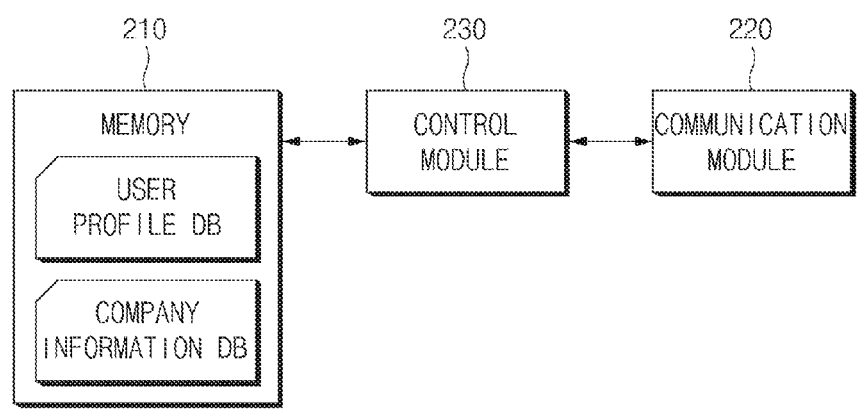
FIG. 7 is a block diagram schematically illustrating a server according to various embodiments of the present disclosure.

FIG. 7 is a block diagram schematically illustrating a server according to various embodiments of the present disclosure.

Referring to FIG. 7, the server 200 may include a memory 210, a communication module 220, and a control module 230.

The memory 210 may store user profile database. The memory 210 may store and update a user profile which is received from the electronic device 100 or is estimated based on a contact list or a call list.

The memory 210 may store user profile estimating algorithm. The user profile estimating algorithm may include information needed to estimate a specific user profile, a method for collecting desired information, or information about whether to estimate a user profile in any manner using the collected information. According to an embodiment of the present disclosure, the user profile estimating algorithm may be learning algorithm. The user profile estimating algorithm may learn the user profile estimating method based on reliable information such as a profile that a user directly inputs, thereby improving accuracy.

The memory 210 may store a word list associated with the user profile. For example, the memory 210 may map and store a specific user profile onto a word line associated therewith.

The memory 210 may store user profile probability information. For example, the server 200 may store probability information that a user storing a specific word (or making a call using a phone number associated with a specific word), probability information that a user corresponding to a specific user profile stores a specific word (or make a call using a phone number associated with a specific word), ratio (or probability) information of users, corresponding to a specific user profile, to all users, or ratio (or probability) information of users, storing a specific user profile, to all users. The user profile probability information may be changed according to join, deletion, a contact list, a call history, and the like of a user utilizing the user profile estimating system and may be continuously updated.

The communication module 220 may be connected with the electronic device 100 through a network and may communicate with the electronic device 100. For example, the communication module 220 may be connected with the electronic device 100 through an internet network or a mobile network.

According to an embodiment of the present disclosure, the communication module 220 may transmit a user profile, which the server 200 estimates, to the electronic device 100 or may receive a user profile which the electronic device 100 estimates.

According to an embodiment of the present disclosure, the communication module 220 may receive a phone number included in a contact list or a call list to the electronic device 100 and may transmit company information associated with a phone number from the electronic device 100.

According to an embodiment of the present disclosure, the communication module 220 may transmit user profile estimating algorithm, a word list associated with a user profile, or user profile probability information to the electronic device 100.

According to an embodiment of the present disclosure, the communication module 220 may receive a contact list or a call list from the electronic device 100.

The control module 230 may control an overall operation of the server 200. For example, the control module 230 may control the memory 210 and the communication module 220 respectively and may estimate a user profile according to various embodiments.

According to an embodiment of the present disclosure, if a phone number is received from the electronic device 100, the control module 230 may search for company information associated with the received phone number. For example, the server 200 may search for at least one of a district, a company name, or a business category associated with the phone number from company information database.

If a contact list or a call list is received from the electronic device 100, the control module 230 may search for company information associated with the phone number included in the contact list or the call list. According to an embodiment of the present disclosure, the control module 230 may search for company information associated with the phone number, not included in the contact list, from among phone numbers included in the call list. According to an embodiment of the present disclosure, the control module 230 may search for company information associated with the phone number, being within a specific time, from among phone numbers included in the call list or the specific number of recent phone numbers thereof. According to an embodiment of the present disclosure, the control module 230 may search for company information associated with the phone number, being within a specific time, from among phone numbers not included in the contact list or the specific number of recent phone numbers thereof.

The control module 230 may estimate a user profile using user profile estimating algorithm. According to an embodiment of the present disclosure, the control module 230 may estimate a user profile using at least one of a word included in the contact list or a word included in the company information, based on the user profile estimating algorithm. For example, the control module 230 may extract a word, associated with a user profile, from among words included in the contact list or words included in the company information using a word list associated with the user profile and may estimate the user profile using the extracted words.

According to an embodiment of the present disclosure, the control module 230 may extract a word, associated with a user profile, from among words included in a specific group of the contact list. For example, in the case of estimating whether the user is married, the control module 230 may extract a word stored in the group "family. In the case of estimating the age of the user, the control module 230 may extract a word stored in the group "family or "friends". In the case of estimating the age group of the user, the control module 230 may extract a word stored in the group "family or "friends".

According to an embodiment of the present disclosure, the control module 230 may estimate a user profile based on the number of extracted words. If the number of extracted marriage-related words such as father-in-law of one's wife, mother-in-law of one's wife, sister-in-law of one's wife, and the like is greater than or equal to a specific number, the control module 230 may estimate that the user is married. If the number of marriage-related words thus extracted is smaller than the specific number, the control module 230 may estimate that the user is single. According to an embodiment of the present disclosure, the control module 230 may estimate a user profile based on probability information of the user profile. For example, in the case of estimating whether the user is married, the control module 230 may compute the probability that the user is married or the probability that the user is single, based on the user profile probability information. If the probability that the user is married is higher than the probability that the user is single, the control module 230 may estimate that the user is married. If the probability that the user is single is higher than the probability that the user is married, the control module 230 may estimate that the user is single.

Below, there will be described various embodiments in which a user profile is estimated according to the user profile estimating algorithm. A user profile estimating method to be described later may be executed on the electronic device 100 or the server 200, and a kind, a collection method and the like about data (or information) used to estimate a user profile are substantially the same as described with reference to FIGS. 1 to 11, and a detailed description thereof may be thus omitted.

<Estimation of User Age>

(1) Data which includes age-related words such as the class of 00, 00 years old, and the like may be extracted from words (e.g., a name or a group name) stored in a contact list of a user. In the case where a word indicating the age is included in the group name, all data included in a corresponding group may be extracted. The extracted data may be classified for a specific age or a specific age group (e.g., 10s, 20s, 30, and the like), and the number of data may be counted for a group. The age or the age group may be estimated using a distribution thereof. For example, a group having the greatest count value may be estimated as the age or the age group. Alternatively, the age group of the user may be estimated using statistics (or probability) data indicating an average age of acquaintances of the user having a specific age or a specific age group or a distribution of ages of the acquaintances. Words which are used to estimate age groups of teacher, professor, deputy section chief, section chief, son, daughter, and the like may be extracted, and a specific age or a specific age group may be weighted based on the extracted words.

(2) Data, which includes words used to estimate the user age, such as classmate, friend, class, and the like may be extracted from names or group names stored in the contact list of the user. In the case where a corresponding word is included in the group name, all data included in a corresponding group may be extracted. A word corresponding to a name may be extracted, and the age or the age group of the user may be estimated using probability information corresponding to a specific age or a specific age group, for an extracted name. For example, in the case where the result of integrating extracted names indicates that probability to correspond to 30s is highest, the user age may be estimated as being 30s.

<Estimation of User Sex>

There may be extracted words (older brother, older sister, brother, sister, father-in-law of one's wife, mother-in-law of one's wife, sister-in-law of one's wife, father-in-law of one's husband, mother-in-law of one's husband, younger master, and the like), which are used to estimate the user sex, from among words stored in a contact list of the user. If "family" exists as a group name included in the contact list, data stored in a family group may be exclusively extracted. The user age may be estimated by counting the number of extracted data. For example, if words, indicating a male, such as brother, father-in-law of one's wife, mother-in-law of one's wife, sister-in-law of one's wife, and the like are extracted three or more, the user sex may be estimated to be male.

<Estimation of Whether User is Married>

(1) Words, indicating the family relations, such as father-in-law of one's wife, mother-in-law of one's wife, sister-in-law of one's wife, father-in-law of one's husband, mother-in-law of one's husband, younger master, younger brother of one's husband, sister of one's husband, and the like may be extracted from words stored in a contact list of the user. If "family" exists as a group name included in the contact list, data stored in a family group may be exclusively extracted. Whether the user is married may be estimated by counting the number of extracted data. For example, if words, indicating marriage, such as father-in-law of one's wife, mother-in-law of one's wife, sister-in-law of one's wife, and the like are extracted two or more, the user may be estimated to be married.

(2) Words, indicating the family relations, such as father-in-law of one's wife, mother-in-law of one's wife, sister-in-law of one's wife, father-in-law of one's husband, mother-in-law of one's husband, younger master, younger brother of one's husband, sister of one's husband, and the like may be extracted from words stored in a contact list of the user. If "family" exists as a group name included in the contact list, data stored in a family group may be exclusively extracted. With regard to each of the extracted words, the probability that the user is married and the probability that the user is single may be computed using probability information of a user profile. The probability that the user is married and the probability that the user is single may be respectively computed by integrating probability information of all extracted words, and whether the user is married may be estimated according to the computation result.

<Estimation of Whether User Plans to Many>

(1) Words, indicating whether the user plans to many, such as studio, wedding hall, travel company, dress, and the like may be extracted from words stored in the contact list of the user. Furthermore, a company name or a business category may be found which is associated with a phone number stored in the contact list or call history of the user. According to an embodiment of the present disclosure, a company name or a business category may be found with respect to a phone number, being within a specific time, from among phone numbers included in a call list or the specific number of recent phone numbers thereof. Words, indicating whether the user plans to many, such as wedding, wedding photo, photos studio, wedding hall, honeymoon, travel company, and the like may be extracted from the found company name or business category. Whether the user plans to many may be estimated by counting the number of extracted data. For example, if words associated with wedding, such as photos studio, travel company, wedding, wedding hall, and the like are extracted two or more, the user may be estimated to plan marriage.

(2) Words, indicating whether the user plans to many, such as studio, wedding hall, travel company, dress, and the like may be extracted from words stored in the contact list of the user. Furthermore, a company name or a business category may be found which is associated with a phone number stored in the contact list or call history of the user. According to an embodiment of the present disclosure, a company name or a business category may be found with respect to a phone number, being within a specific time, from among phone numbers included in a call list or the specific number of recent phone numbers thereof. Words, indicating whether the user plans to many, such as wedding, wedding photo, photos studio, wedding hall, honeymoon, travel company, and the like may be extracted from the found company name or business category. With regard to each of the extracted words, whether the user plans to many and whether the user does not plan marriage may be computed using probability information of a user profile. Whether the user plans to many and whether the user does not plan marriage may be respectively computed by integrating probability information of all extracted words, and whether the user plans to many may be estimated according to the computation result.

<Estimation of Whether User has Children>

(1) Words, indicating whether the user has children, such as obstetrics, pediatrics, kindergarten, day care center, and the like may be extracted from words stored in the contact list of the user. Furthermore, a company name or a business category may be found which is associated with a phone number stored in the contact list or call history of the user. According to an embodiment of the present disclosure, a company name or a business category may be found which is associated with a phone number, not included in the contact list, from among phone numbers included in the call list. Words, indicating whether the user has children, such as pediatrics, kindergarten, day care center, nursery products, and the like may be extracted from the found company name or business category. Whether the user has children may be estimated by counting the number of extracted data. For example, if words indicating that the user has children are extracted four or more, the user may be estimated to have children.

(2) Words, indicating whether the user has children, such as obstetrics, pediatrics, kindergarten, day care center, and the like may be extracted from words stored in the contact list of the user. Furthermore, a company name or a business category may be found which is associated with a phone number stored in the contact list or call history of the user. According to an embodiment of the present disclosure, a company name or a business category may be found which is associated with a phone number, not included in the contact list, from among phone numbers included in the call list. Words, indicating whether the user has children, such as pediatrics, kindergarten, day care center, nursery products, and the like may be extracted from the found company name or business category. With regard to each of the extracted words, whether the user has children and whether the user does have children may be respectively computed using probability information of a user profile. Whether the user has children and whether the user does have children may be respectively computed by integrating probability information of all extracted words, and whether the user has children may be estimated according to the computation result.

<Estimation of Whether User has Car>

Words, indicating whether the user has a car, such as garage, car insurance, fire, gas station, car center, LPG filling station, car place, tuning shop, and the like may be extracted from words stored in the contact list of the user. Furthermore, a company name or a business category may be found which is associated with a phone number stored in the contact list or call history of the user. According to an embodiment of the present disclosure, a company name or a business category may be found which is associated with a phone number, not included in the contact list, from among phone numbers included in the call list. Words, indicating whether the user has a car, such as car, car maintenance, car tuning, car place, car center, car insurance, and the like may be extracted from the found company name or business category. With regard to each of the extracted words, whether the user has a car and whether the user does have a car may be respectively computed using probability information of a user profile. Whether the user has a car and whether the user does have a car may be respectively computed by integrating probability information of all extracted words, and whether the user has a car may be estimated according to the computation result.

<Estimation of User Residential District>

A company name or a business category may be found which is associated with a phone number stored in a call list. There may be extracted district information of data, of which the business category belongs to a category associated with the user residence such as restaurant, hypermarket, wholesale/retail trade, and the like, from among the found data. The number of data extracted for a district may be counted, and the user residential district may be estimated according to the counting result. For example, a district in which the number of extracted data is greatest may be estimated as the user residential district.

Figure 8:
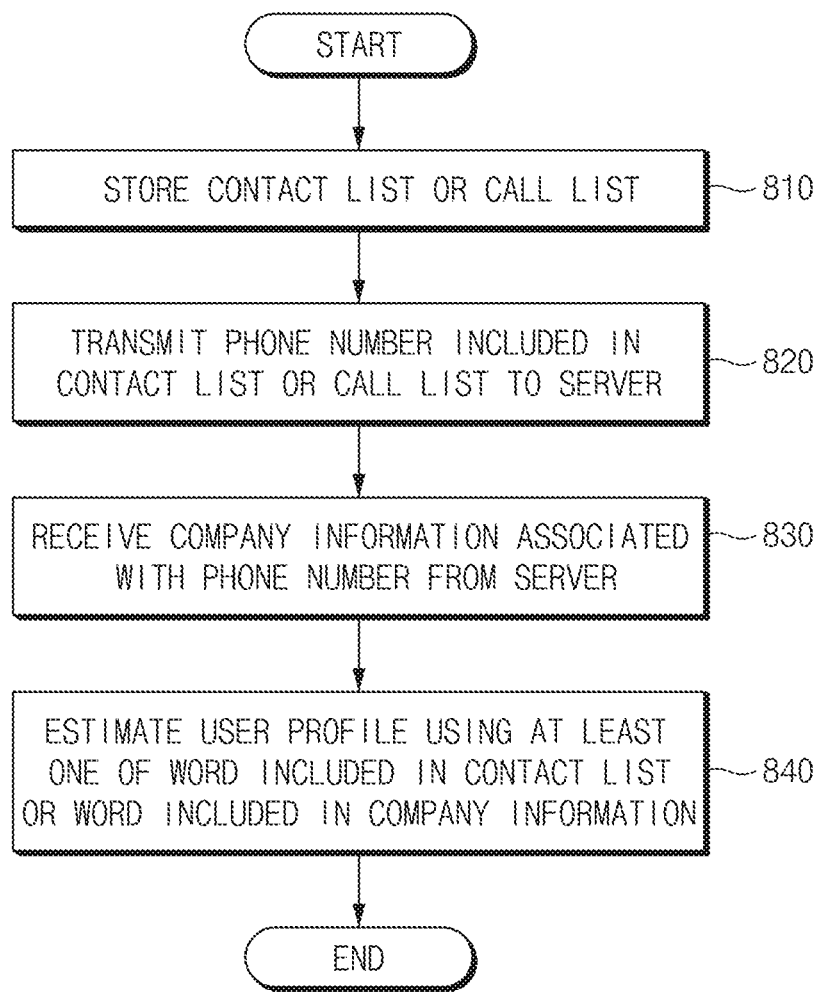
FIG. 8 is a flowchart schematically illustrating a user profile estimating method of an electronic device according to various embodiments of the present disclosure.

FIG. 8 is a flowchart schematically illustrating a user profile estimating method of an electronic device according to various embodiments of the present disclosure. A flowchart illustrated in FIG. 8 may include operations which the electronic device 100 illustrated in FIGS. 1 to 6. Even though omitted below, information about the electronic device 100 given with reference to FIGS. 1 to 6 may be applied to the flowchart illustrated in FIG. 8.

Referring to FIG. 8, in operation 810, the electronic device 100 may store at least one of a contact list or a call list. The contact list may include at least one of a phone number, a word (e.g., a name or a company name), or group information. The call list may include at least one of a phone number of the other party or call time information in the case where the user makes a call using the electronic device 100.

In operation 820, the electronic device 100 may transmit a phone number included in at least one of the contact list or the call list to the server 200. According to an embodiment of the present disclosure, the electronic device 100 may transmit a phone number, not stored in the contact list, from among phone numbers included in the call list to the server 200. According to an embodiment of the present disclosure, the electronic device 100 may transmit, to the server 200, a phone number, being within a specific time, from among phone numbers included in the call list or the specific number of recent phone numbers thereof. According to an embodiment of the present disclosure, the electronic device 100 may transmit, to the server 200, a phone number, being within a specific time, from among phone numbers not included in the contact list or the specific number of recent phone numbers thereof.

The electronic device 100, in operation 830, may receive company information associated with a phone number from the server 200. For example, the electronic device 100 may receive at least one of a district, a company name, or a business category associated with a phone number.

In operation 840, the electronic device 100 may estimate a user profile using at least one of a word included in the contact list or a word included in the company information. For example, the user profile may include at least one of sex, age group, occupation, whether he or she is married, whether he or she plans to marry, whether he or she has children, whether he or she has a pet, whether he or she has a car, whether he or she has moved to a new place, or a residential district, and the like. According to an embodiment of the present disclosure, the electronic device 100 may extract a word, associated with the user profile, from among words included in the contact list or words included in the company information using a word list associated with the user profile and may estimate the user profile using the extracted word.

According to an embodiment of the present disclosure, the electronic device 100 may extract a word, associated with the user profile, from among words included in a specific group of the contact list. For example, in the case of estimating whether the user is married, the electronic device 100 may extract a word stored in the group "family".

According to an embodiment of the present disclosure, the control module 130 may estimate the user profile based on the number of extracted words. Alternatively, the control module 130 may estimate the user profile based on probability information of the user profile. For example, the control module 130 may estimate the user profile using at least one of probability information that a user storing the extracted word or making a call using a phone number associated with the extracted word corresponds to a user profile, probability information that a user corresponding to the user profile stores the extracted word or makes a call using a phone number associated with the extracted word, ratio information of users, corresponding to the user profile, to all users, or ratio information of users, storing the extracted word, to all users.

Figure 9:
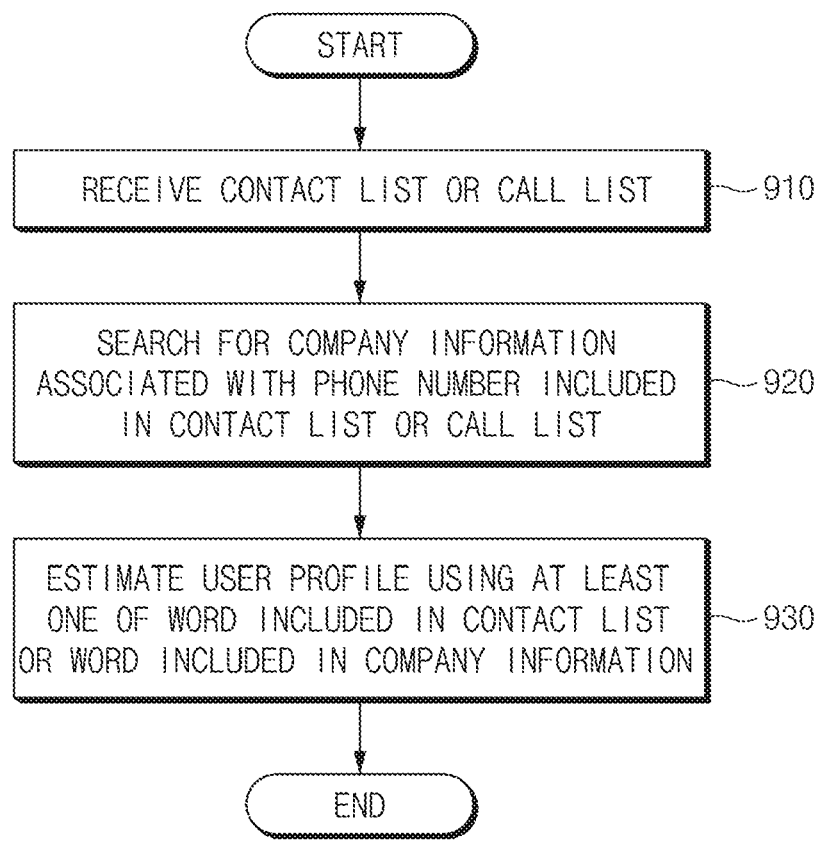
FIG. 9 is a flowchart schematically illustrating a user profile estimating method of a server according to various embodiments of the present disclosure.

FIG. 9 is a flowchart schematically illustrating a user profile estimating method of a server according to various embodiments of the present disclosure. A flowchart illustrated in FIG. 9 may include operations which the server 200 illustrated in FIGS. 5 and 7 processes. Even though omitted below, information about the electronic device 100 given with reference to FIGS. 1 to 5 and 7 may be applied to the flowchart illustrated in FIG. 9.

Referring to FIG. 9, in operation 910, the server 200 may receive at least one of a contact list or a call list from the electronic device 100.

In operation 920, the server 200 may search for company information associated with a phone number included in at least one of the contact list or the call list. For example, the server 200 may search for at least one of a district, a company name, or a business category associated with a phone number.

The server 200, in operation 930, may estimate a user profile using at least one of words included in the contact list or words included in the company information. For example, the user profile may include at least one of sex, age group, occupation, whether he or she is married, whether he or she plans to many, whether he or she has children, whether he or she has a pet, whether he or she has a car, whether he or she has moved to a new place, or a residential district, and the like. According to an embodiment of the present disclosure, the server 200 may extract a word, associated with the user profile, from among words included in the contact list or words included in the company information using a word list associated with the user profile and may estimate the user profile using the extracted word.

According to an embodiment of the present disclosure, the server 200 may extract a word, associated with the user profile, from among words included in a specific group of the contact list. For example, in the case of estimating whether the user is married, the electronic device 100 may extract a word stored in the group "family".

According to an embodiment of the present disclosure, the server 200 may estimate the user profile based on the number of extracted words. Alternatively, the server 200 may estimate the user profile based on probability information of the user profile. For example, the server 200 may estimate the user profile using at least one of probability information that a user storing the extracted word or making a call using a phone number associated with the extracted word corresponds to the user profile, probability information that a user corresponding to the user profile stores the extracted word or makes a call using a phone number associated with the extracted word, ratio information of users, corresponding to the user profile, to all users, or ratio information of users, storing the extracted word, to all users.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a non-transitory computer-readable storage medium in the form of a program module. The instruction, when executed by one or more processors (e.g., the control module 130 or 230), may cause the one or more processors to perform a function corresponding to the instruction. The non-transitory computer-readable storage medium, for example, may be the memory 110 or 210.

The non-transitory computer-readable recording medium may include a hard disk, a magnetic media, a floppy disk, a magnetic media (e.g., a magnetic tape), an optical media (e.g., a compact disc read only memory (CD-ROM) and a DVD, a magneto-optical media (e.g., a floptical disk), and hardware devices (e.g., a ROM, a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

According to various embodiments of the present disclosure, various user profiles may be estimated using a contact list or a call history. Furthermore, the estimated user profiles may be used to provide various services such as marketing, advertisement, recommendation of contents, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory configured to store at least one of a contact list or a call list;
    a transceiver configured to:
        transmit a phone number, included in at least one of the contact list or the call list, to a server, and
        receive company information, associated with the phone number, from the server; and
    at least one processor configured to:
        extract a word, associated with a user profile, from among a word included in the company information using a word list associated with the user profile, and
        estimate the user profile using the extracted word,
    wherein the at least one processor is further configured to estimate the user profile using at least one of:
        probability information that a user making a call using a phone number associated with the extracted word corresponds to the user profile,
        probability information that a user corresponding to the user profile makes a call using a phone number associated with the extracted word,
        ratio information of users, corresponding to the user profile, to all users, or
        ratio information of users, storing the extracted word, to all users.

2. The electronic device of claim 1, wherein the company information comprises at least one of a district, a company name, or a business category.

3. The electronic device of claim 1, wherein the at least one processor is further configured to transmit a phone number, not stored in the contact list, from among phone numbers included in the call list to the server.

4. The electronic device of claim 1, wherein the at least one processor is further configured to transmit a phone number, being within a specific time, from among phone numbers included in the call list or a specific number of recent phone number from among phone numbers included in the call list to the server.

5. The electronic device of claim 1, wherein the at least one processor is further configured to extract a word, associated with the user profile, from among words included in a specific group of the contact list.

6. The electronic device of claim 1, wherein the at least one processor is further configured to estimate the user profile based on a number of the extracted words.

7. The electronic device of claim 1, wherein the user profile comprises at least one of a sex, an age group, an occupation, whether he or she is married, whether he or she plans to marry, whether he or she has children, whether he or she has a pet, whether he or she has a car, whether he or she has moved to a new place, or a residential district.

8. A user profile estimating method of an electronic device, the method comprising:
    storing at least one of a contact list or a call list in a memory;
    transmitting a phone number, included in at least one of the contact list or the call list, to a server;
    receiving company information, associated with the phone number, from the server;
    extracting a word, associated with a user profile, from among a word included in the company information using a word list associated with the user profile; and
    estimating the user profile using the extracted word,
    wherein the estimating of the user profile using the extracted word comprises estimating the user profile using at least one of:
        probability information that a user making a call using a phone number associated with the extracted word corresponds to the user profile,
        probability information that a user corresponding to the user profile makes a call using a phone number associated with the extracted word,
        ratio information of users, corresponding to the user profile, to all users, or
        ratio information of users, storing the extracted word, to all users.

9. The method of claim 8, wherein the company information comprises at least one of a district, a company name, or a business category.

10. The method of claim 8, wherein the transmitting of the phone number comprises:
    transmitting a phone number, not stored in the contact list, from among phone numbers included in the call list to the server.

11. The method of claim 8, wherein the transmitting of the phone number comprises:
    transmitting a phone number, being within a specific time, from among phone numbers included in the call list or a specific number of recent phone number from among phone numbers included in the call list to the server.

12. The method of claim 8, wherein the extracting of the word comprises:
    extracting words, associated with the user profile, from among words included in a specific group of the contact list.

13. The method of claim 8, wherein the estimating of the user profile using the extracted word comprises:
    estimating the user profile based on a number of the extracted words.

14. The method of claim 8, wherein the user profile comprises at least one of a sex, an age group, an occupation, whether he or she is married, whether he or she plans to marry, whether he or she has children, whether he or she has a pet, whether he or she has a car, whether he or she has moved to a new place, or a residential district.

15. A non-transitory computer-readable storage medium configured to store one or more computer programs including instructions that, when executed by at least one processor, cause the at least one processor to control for:
    storing at least one of a contact list or a call list in a memory;
    transmitting a phone number, included in at least one of the contact list or the call list, to a server;
    receiving company information, associated with the phone number, from the server; and
    extracting a word, associated with a user profile, from among a word included in the company information using a word list associated with the user profile; and
    estimating the user profile using the extracted word,
    wherein the estimating of the user profile using the extracted word comprises estimating the user profile using at least one of:
        probability information that a user making a call using a phone number associated with the extracted word corresponds to the user profile,
        probability information that a user corresponding to the user profile makes a call using a phone number associated with the extracted word,
        ratio information of users, corresponding to the user profile, to all users, or
        ratio information of users, storing the extracted word, to all users.

* * * * *